UNITED STATES PATENT OFFICE.

JAMES CRISWELL, OF PITTSBURG, PENNSYLVANIA.

IMPROVEMENT IN PREPARING OLEAGINOUS SEEDS FOR PRESSING BY HEATING THEM WITH STEAM.

Specification forming part of Letters Patent No. 334, dated July 31, 1837.

*To all whom it may concern:*

Be it known that I, JAMES CRISWELL, of the city of Pittsburg, and State of Pennsylvania, have invented a new and improved method of heating flaxseed or other oleaginous seeds preparatory to expressing the oil therefrom; and I do hereby declare that the following is a full and exact description.

The nature of my invention consists in conveying steam by means of a tube into a steam-chest, flat on the top, with a rim round it, within which rim the seed is placed in such a manner as to expose it to the heat from the steam within the chest. The chest and tube may be of any given size, dimension, or construction to suit the convenience of the manufacturer.

What I claim, therefore, as new is—

The application of steam to the heating of flaxseed or other oleaginous seeds preparatory to the expressing the oil therefrom, by means of any apparatus so constructed as to expose the seed to the heating influence of the steam, no claim being made by me to the apparatus used.

JAMES CRISWELL.

Witnesses:
ROBT. CHRISTY,
JOHN FLEMING.